United States Patent
Takeuchi et al.

(10) Patent No.: US 6,801,007 B2
(45) Date of Patent: Oct. 5, 2004

(54) ELECTRICALLY-OPERATED ACTUATOR SYSTEM

(75) Inventors: Tokuhisa Takeuchi, Chita-gun (JP); Takashi Takata, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/613,161

(22) Filed: Jul. 3, 2003

(65) Prior Publication Data

US 2004/0012357 A1 Jan. 22, 2004

(30) Foreign Application Priority Data

Jul. 3, 2002 (JP) ........................................ 2002-194736

(51) Int. Cl.[7] ................................................. H02P 3/00
(52) U.S. Cl. ...................... 318/479; 318/466; 318/772; 318/786; 315/200 A; 315/291
(58) Field of Search ................................. 318/470–479, 318/466, 468, 772, 781, 785, 786; 315/200 A, 291; 303/92, 20

(56) References Cited

U.S. PATENT DOCUMENTS

| | | | | |
|---|---|---|---|---|
| 4,433,390 A | * | 2/1984 | Carp et al. ..................... 714/23 |
| 4,453,117 A | * | 6/1984 | Elms et al. .................. 318/778 |
| 4,456,867 A | * | 6/1984 | Mallick et al. ............. 318/778 |
| 4,467,260 A | * | 8/1984 | Mallick et al. ............. 318/800 |
| 4,622,506 A | * | 11/1986 | Shemanske et al. ........ 318/786 |
| 4,982,443 A | * | 1/1991 | Komoda ..................... 455/117 |
| 5,334,922 A | * | 8/1994 | Manini ....................... 318/772 |
| 5,372,410 A | * | 12/1994 | Miller et al. ........... 303/122.05 |
| 5,803,355 A | | 9/1998 | Ureshino et al. |
| 2004/0021427 A1 | * | 2/2004 | Bruwer et al. .......... 315/200 A |

FOREIGN PATENT DOCUMENTS

JP    2002-354885    12/2002

* cited by examiner

*Primary Examiner*—Paul Ip
(74) *Attorney, Agent, or Firm*—Harness, Dickey & Pierce, PLC

(57) ABSTRACT

A motor stopping circuit is activated when a motor control circuit is stopped by a reset signal outputted from a reset circuit. This maintains an overrun angle small. As a result, a difference between a rotation angles measured when the motor control circuit is turned off and measured when the motor control circuit is turned on are small. Therefore, frequent origin setting operation is not required. This reduces sizes and manufacturing costs of a stopper and an actuator.

5 Claims, 8 Drawing Sheets

ELECTRICALLY-OPERATED ACTUATOR SYSTEM

CROSS REFERENCE TO RELATED APPLICATION

This application is based on and incorporates herein by reference Japanese Patent Application No. 2002-194736 filed on Jul. 3, 2002.

FIELD OF THE INVENTION

The present invention relates to an electrically-operated actuator system.

BACKGROUND OF THE INVENTION

The applicant of the present invention has suggested an electrically-operated actuator system that uses a pulse encoder for controlling a rotation angle of an electric motor in JP-A-2002-354885. In this system, the rotation angle is controlled based on pulse signals corresponding to the rotation angle. A motor control circuit operates according to control signals produced by a motor control circuit and supplies driving current to the motor.

The inventors of the present invention experimentally added a reset circuit to the actuator system to control operations of the motor control circuit. The reset circuit turns off the motor control circuit when the voltage applied to the circuit becomes lower than a predetermined level. When the voltage becomes higher than the predetermined level again, the reset circuit turns on the motor control circuit.

However, the motor continues rotating for a while due to the moment of inertia after the motor control circuit is turned off. In other words, the motor control circuit is unable to control the motor after the voltage becomes lower than the predetermined level and the motor stops with a large overrun. If the overrun is very large, the amount of motor rotation while the motor control circuit is turned off is not determined nor the amount of the overrun.

In a rotation angle determination process, the rotation angle of the motor is determined based on an angle shifted from a reference position (relative rotation angle). If the reference position is not accurately determined, the amount of motor rotation is not accurately determined. The actuator may be mechanically controlled for bringing it back to the reference position.

The actuator may be driven until it hits a stopper before the restart to bring it back to the reference position. However, the actuator requires a durable structure to resist the mechanical strain. This increases size and manufacturing cost of the actuator.

SUMMARY OF THE INVENTION

The present invention therefore has an objective to provide an electrically-operated actuator in which an electric motor stops with a small overrun when a motor control circuit is turned off. The present invention has another objective to provide an actuator that does not require frequent origin setting operations.

The actuator of the present invention includes an electric motor, a rotation angle determination means, a motor control means, a reset means, a motor driving means, a motor stopping means, and a motor stopping means driving means. The rotation angle determination means determines a rotation angle of an output shaft of the motor based on pulse signals produced according to a rotation angle of the motor. The motor control means controls operations of the motor based on the rotation angle determined by the rotation angle determination means. The reset means turns off the motor control means when a voltage applied to the motor control means becomes lower than a predetermined level. When the voltage becomes higher than the predetermined level, the reset means turns on the motor control means.

The motor driving means controls driving current supplied to the motor based on control signals from the motor control means. The motor stopping means electrically stops the motor based on control signals from the motor control means. The motor stopping means driving means drives the motor stopping means when the motor control means is turned off by the reset means.

With this configuration, the motor is stopped by electrical breaking. Therefore, the motor is stopped with a small overrun after the motor control means is turned off, that is, an overrun angle is small. Since the rotation angle at the restart is not much different from the angle at the stop, the angle shifted after the motor control means stops is easily determined. The reference position determination is not required upon the restart of the motor. Therefore, the number of the origin setting operations reduces, in other words, the actuator does not require a durable construction. Thus, size and manufacturing cost of the actuator are reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

First Embodiment

Figure 1:
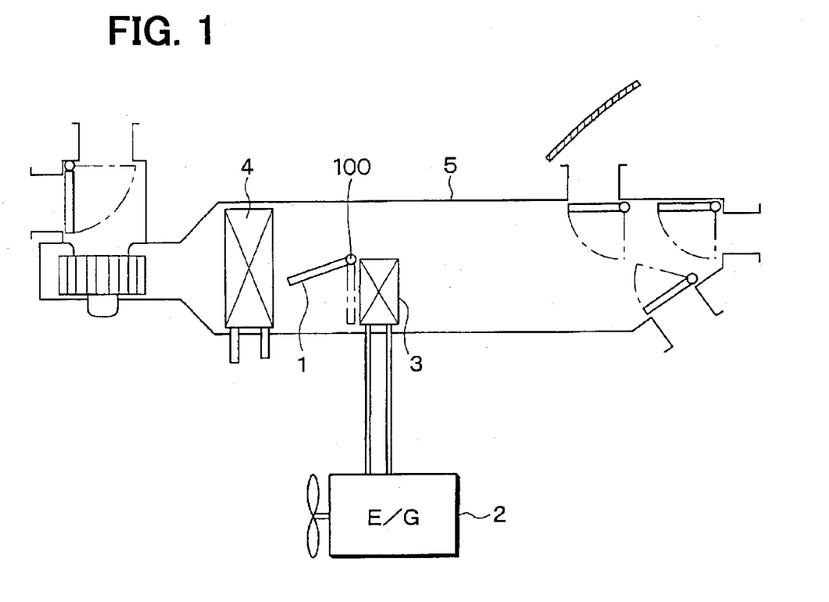
FIG. 1 is a schematic view of a vehicular air conditioning system in which an electrically-operated actuator of the first embodiment of the present invention is applied.

Referring to FIG. 1, an actuator 100 is installed in a vehicular air conditioning system for driving an air mix door 1. A coolant of an engine 2 is heated by a heater core 3 and the air is warmed up by the heated coolant. The air mix door adjusts the warm air flowing around the heater core 3 to adjust the temperature of the air flowing into the room. An air conditioner casing 5, which is made of resin, houses the air mix door, the heater core 3, and an evaporator 4. The actuator 100 is fixed to the casing 5.

Figure 2:
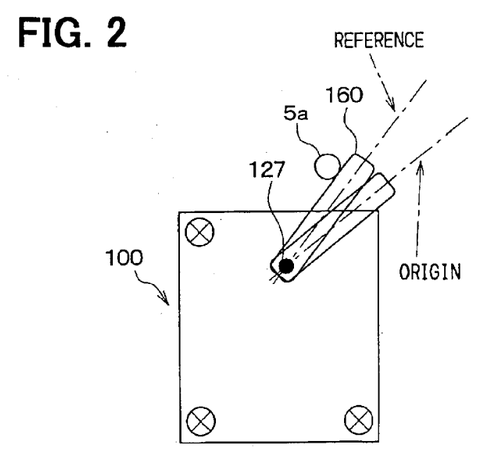
FIG. 2 is an external view of the actuator.
Figure 3:
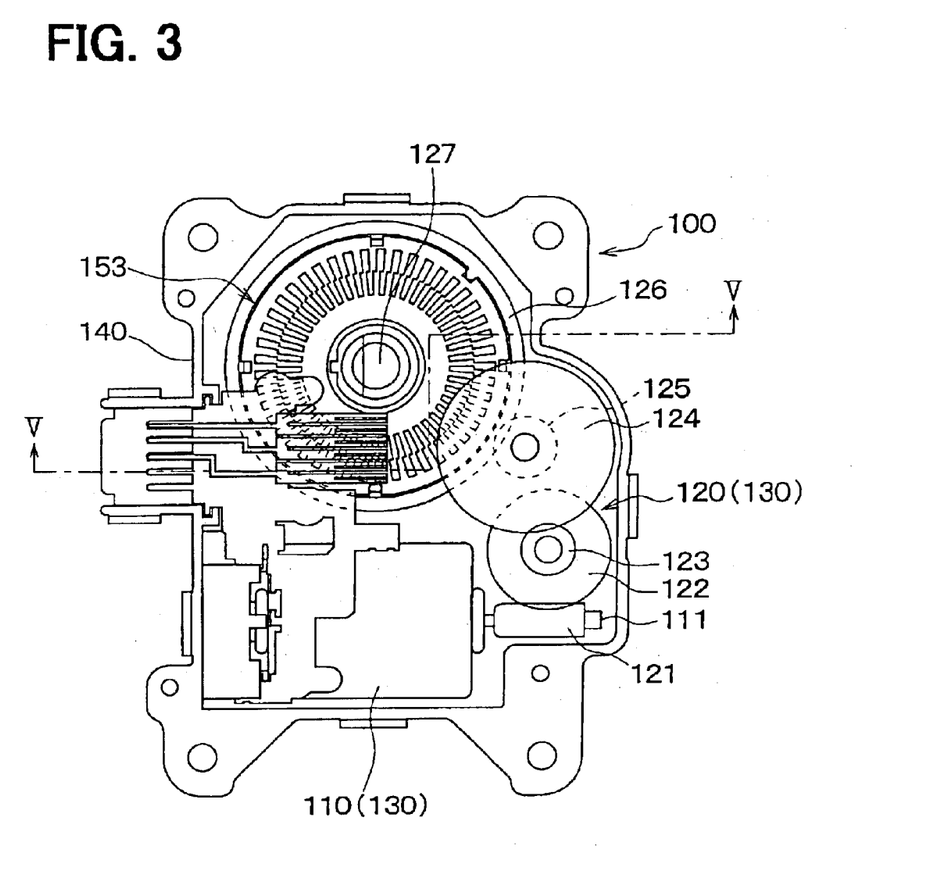
FIG. 3 is a plan view of the actuator.

Detailed configurations of the actuator 100 are shown in FIGS. 2 and 3. A driving section 130 of the actuator includes a DC motor 110 and a motor speed reduction mechanism 120. The DC motor 110 rotates with power supplied by an onboard battery (not shown). The motor speed reduction mechanism 120 reduces the rotation speed of the motor output and transmits torque at the reduced speed.

The mechanism 120 is a series of gears including a worm gear 121, a worm wheel 122, and spur gears 123, 124, 125. The worm gear 121 is tightly fitted to an output shaft 111 of the motor 110. The spur gear 125 engages an end gear 126 that has an output shaft 127. The driving section 130 is housed in a case 140 to which brushes 155 to 157 are fixed.

Figure 4A:
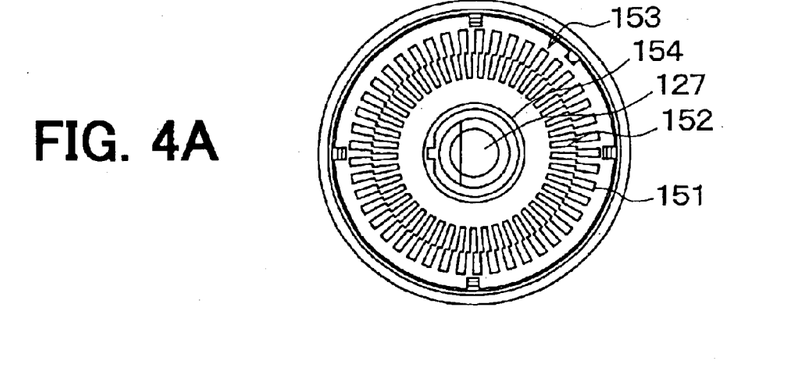
FIG. 4A is a front view of a pulse plate included in the actuator.
Figure 4B:
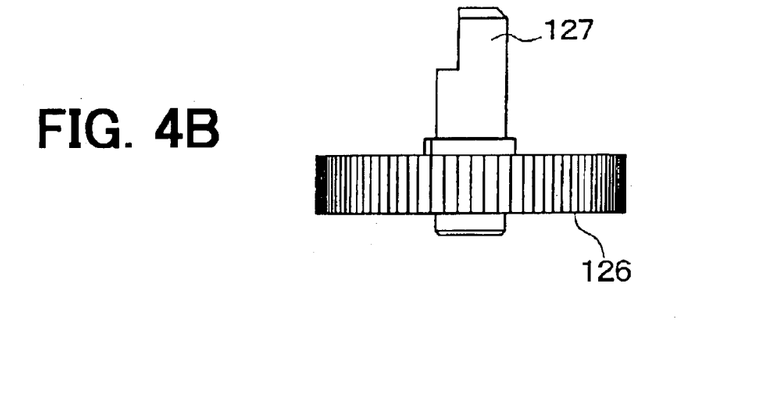
FIG. 4B is a side view of the pulse plate.

A pulse pattern plate 153 is provided around the output shaft 127. The pattern plate 153 includes the first pulse pattern 151 and the second pulse pattern 152. Each pulse pattern 151, 152 include conductive portions 151a, 152a and non-conductive portions 151b, 152b, respectively. The pattern plate 153 rotates with the output shaft 127.

Figure 6:
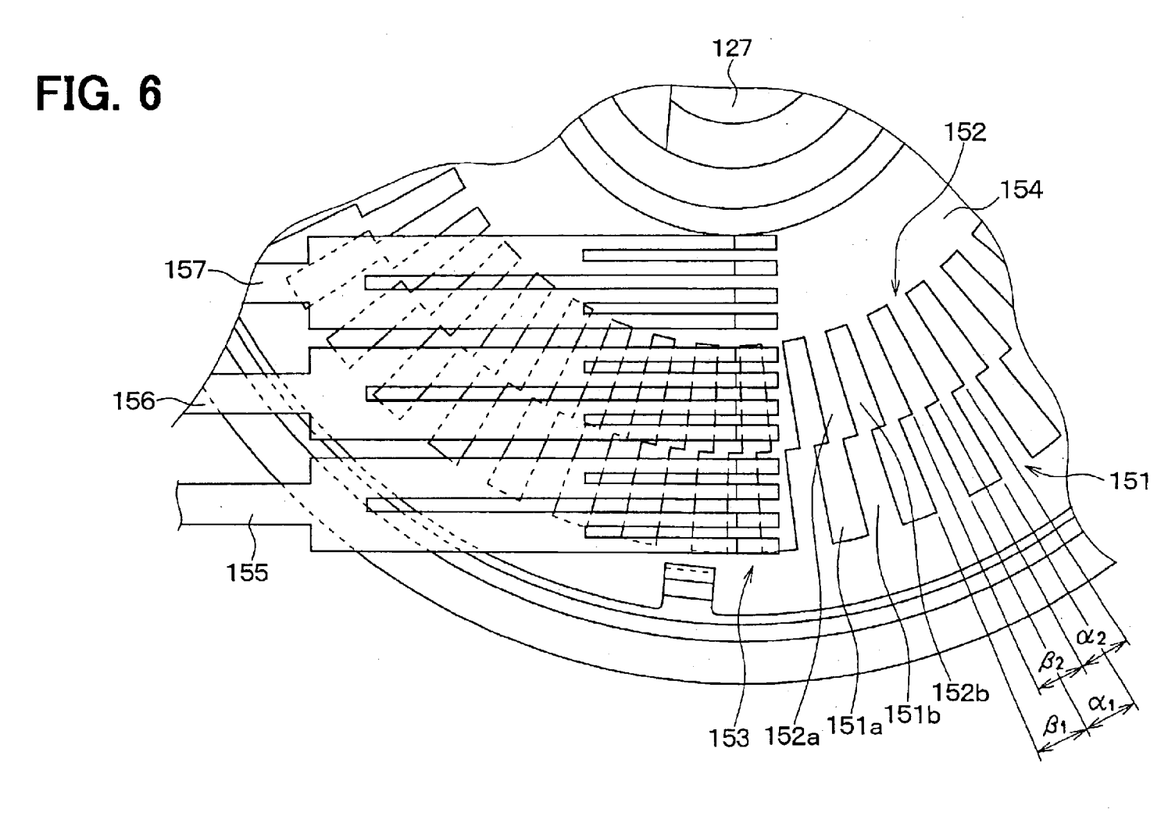
FIG. 6 is an enlarged partial view of the pulse plate shown in FIG. 4A.

Inscribed angles α1, α2 of the conductive portions 151a, 152a and inscribed angles β1, β2 of the non-conductive portions 151b, 152b are approximately equal. A phase of the first pulse pattern 151 differs from that of the second pulse pattern 152 by approximately half of the inscribed angles α1, α2. The first and the second pulse patterns 151, 152 are electrically connected to each other and to a common pattern 154 located closer to the center than the first and the second patterns 151, 152. They are all electrically connected to a negative terminal of the battery via the brush 157.

Figure 5:
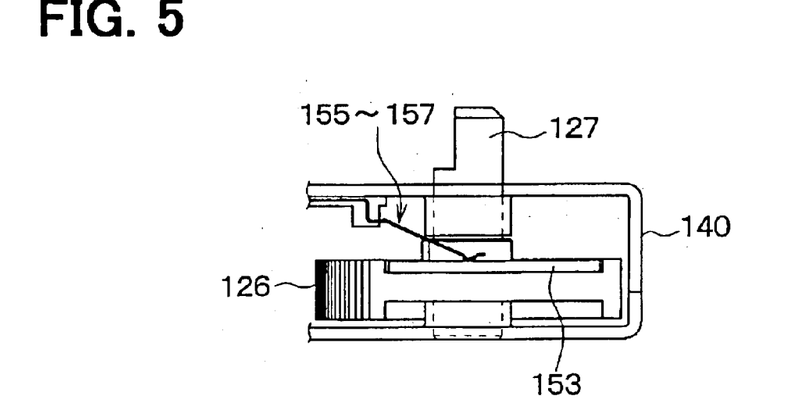
FIG. 5 is a cross-sectional view of section A—A of the actuator shown in FIG. 3.

Three brushes 155 to 157, made of copper-based conductive materials, are fixed to the case 140 and electrically connected to a positive terminal of the battery. The first brush 155, the second brush 156, and the third brush 157 touch the first pattern 151, the second pattern 152, and the common pattern, respectively. The brushes 155 to 157 have contacts with conductive portions 151a, 152a of the pulse patterns at four points (including the common pattern 154). As a result, the electrical connections are ensured.

A link lever 160 is tightly fixed to the output shaft 127 for swinging the air mix door 1 as shown in FIG. 2. The casing 5 has a stopper 5a for stopping the link lever 160.

Figure 7:
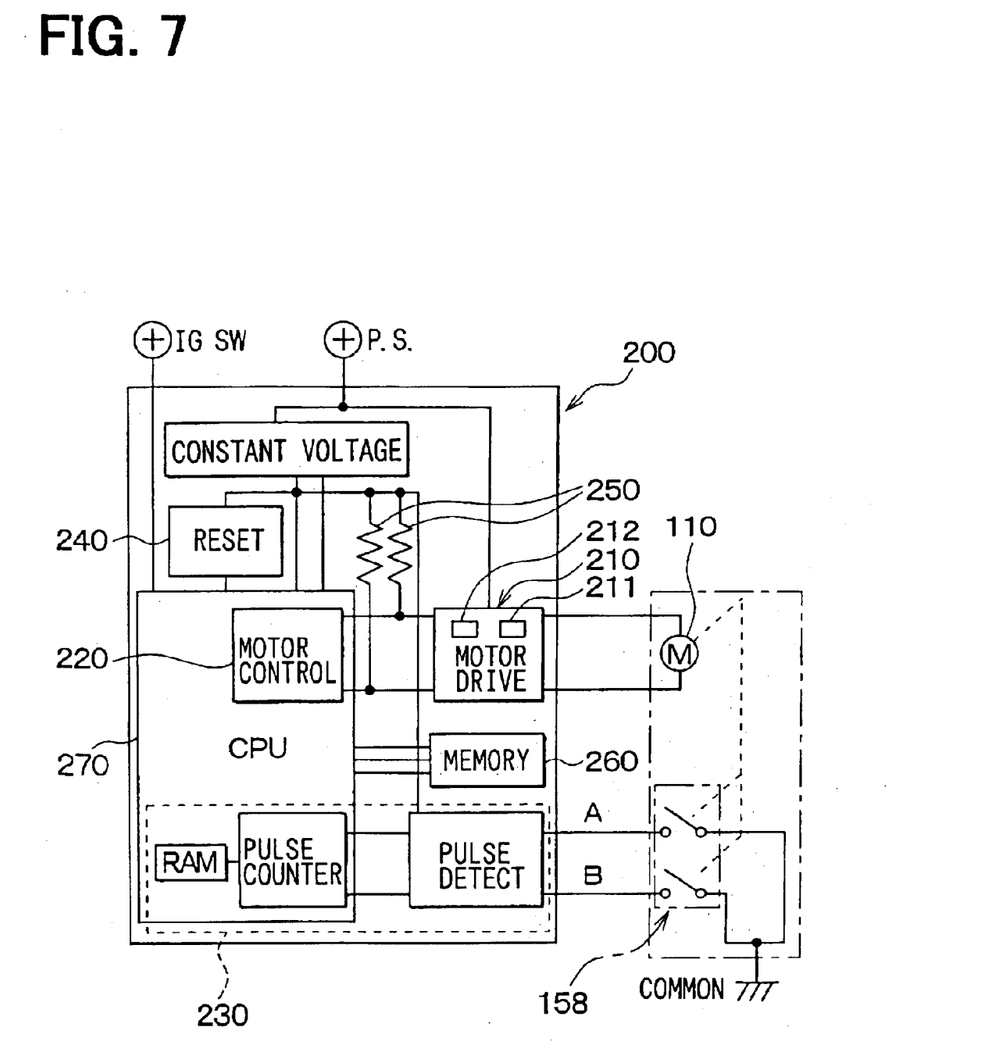
FIG. 7 is a block diagram of a control circuit of the actuator.

An electric control circuit 200 of the actuator 100 is shown in FIG. 7. The control circuit 200 includes a motor driving section 210 that has a motor driving circuit 211 and a motor stopping circuit 212. The motor driving circuit 211 feeds driving current to the DC motor 110 based on an instruction signal from a motor control circuit 220. The motor stopping circuit 212 supplies stopping current to the DC motor 110.

The motor control circuit 220 controls the motor driving section 210 by outputting high level (Hi) signals or low level (Lo) signals to the motor driving circuit 211 and the motor stopping circuit 212 via signal lines. The motor stopping circuit 212 starts operating when the signals at both lines are Hi.

A rotation angle determination circuit 230 determines a rotation angle and the direction of the rotation of the output shaft 127 based on pulse signals produced in the patter plate 153. A memory circuit 260 stores control information. A memory device that operates without power, such as an EEPROM, is used for the memory circuit 260.

Figure 8:
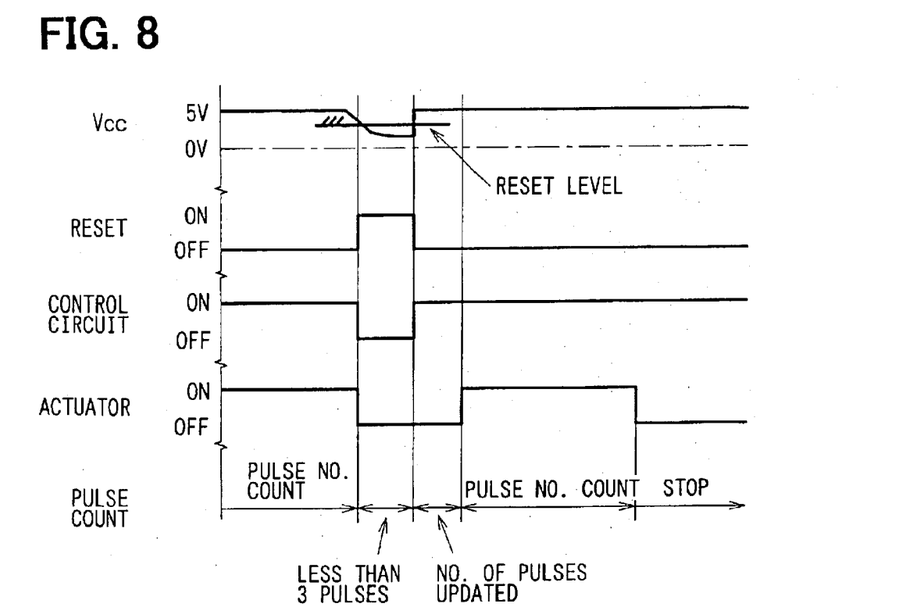
FIG. 8 is a timing chart showing controls of the actuator.

A reset circuit 240 produces reset signals to turn off the motor control circuit 220 when a voltage applied to the control circuit 220 is lower than a predetermined level. When the voltage becomes higher than the predetermined level, it stops producing the reset signals to turn on the control circuit 220. The timing of the controls is shown in FIG. 8.

A pull-up resistor 250 is a motor stopping means driving means for driving the motor stopping circuit 212 by producing the Hi signals to the signal lines when the control circuit 220 is turned off. The pull-up resistor 250 has a resistance lower than an impedance of a microcomputer constructed of the control circuit 220 and the angle determination circuit 230 at halt. When the microcomputer stops, the Hi signal is inputted to the control circuit 220 via the pull-up resistor 250.

Operations of the actuator 100 will be explained below. When the DC motor 110 starts rotating, torque generated by the DC motor 110 is applied to the output shaft 127. The first and the second brushes 155, 156 touch the conductive portions 151a, 152a, and the non-conductive portions 151b, 152b in turn while the output shaft rotates. This changes conducting conditions of the output between a conducting (ON) state and a non-conducting (OFF) state periodically.

Figure 9:
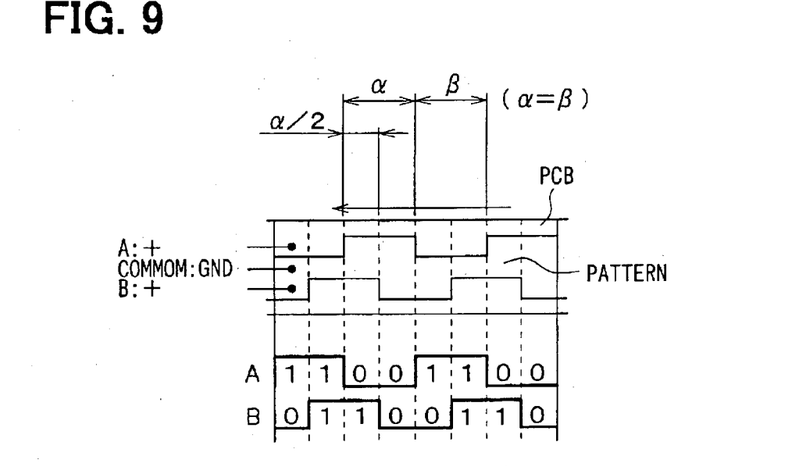
FIG. 9 is a timing chart of pulse signals of the actuator.

The timing chart of the above-described operation is shown in FIG. 9. Pulse signals appear at the first and the second brushes 155, 156 as the DC motor rotates for a predetermined angle. The rotation angle of the output shaft 127 is determined by counting the pulse signals by the rotation angle determination circuit 230. Combinations of zero and one of the pulse signals in phase A and phase B indicates an angle shift from a previous position to the current position. This is only when the current position is shifted within three pulses. Therefore, the motor can be stopped with the rheostatic braking within three pulses.

A pulse generator 158 is constructed of the first and the second brushes 155, 156, and the pattern plate 153. The pulse generator 158 outputs a pulse signal as the output shaft rotates for the predetermined angle.

Since the first pulse pattern 151 and the second pulse pattern 152 are out of phase, the pulse signals caused by them are also out of phase. The pulse signals produced by the first pattern 151 and the first brush 155 has phase A, and the pulse signals produced by the second pattern 152 and the second brush 156 has phase B. The direction of rotation of the DC motor 110 is determined based on which phase, A or B, is inputted to the rotation angle determination circuit 230.

The DC motor 110 is mechanically stopped when the link lever 160 hits the stopper 5a. The position at which the DC motor 110 is mechanically stopped is stored as a reference position. When controlling the amount of rotation of the motor 110, that is, the amount of rotation of the output shaft 127, a position two pulses from the reference position is set as an origin. This process is referred to as an origin setting operation. This position is not set as the origin when the battery is disconnected or abnormal pulse signals are produced. It is determined that the link lever 160 hits the stopper 5a when the level of the pulse signals stops changing.

Referring to FIG. 8, a reset signal is outputted from the reset circuit when the output of the constant voltage circuit becomes lower than a reset level. When the control circuit 220 is turned off based on the reset signal, the motor stopping circuit 212 is activated to electrically stop the motor 110 by shorting an armature of the motor 110. As a result, the overrun angle remains small.

A difference in rotation angles between the stop and the restart of the control circuit 220 is small. The position of the actuator 100 can be confirmed via the pulse signal detecting circuit. This reduces the number of times when the origin setting operation is required. Furthermore, the sizes and the manufacturing cost of the stopper 5a and the actuator 100 remain at low.

The motor stopping circuit 212 is required to produce a stopping force to stop the motor 110 within three pulses after the Hi signal is inputted via the pull-up resistor 250. That is, the number of pulses counted after the motor stopping circuit is turned off should be less than three pulses. The overrun angle cannot be reduced to zero degree. A condition of the pulse signal when the motor control circuit 220 is tuned off and the number of the pluses are stored in the memory circuit 260 or a RAM. The CPU updates rotation angle information stored in the angle determination circuit 230 based on the stored pulse condition and the pulse condition when the control circuit 220 is turned on. This improves an accuracy of the control performed by the actuator 100.

The pulse signals upon the restart are accurately detected by driving the motor stopping circuit 212 based on the control signal from the motor control circuit 220 for a predetermined period after the restart.

Second Embodiment

Figure 10:
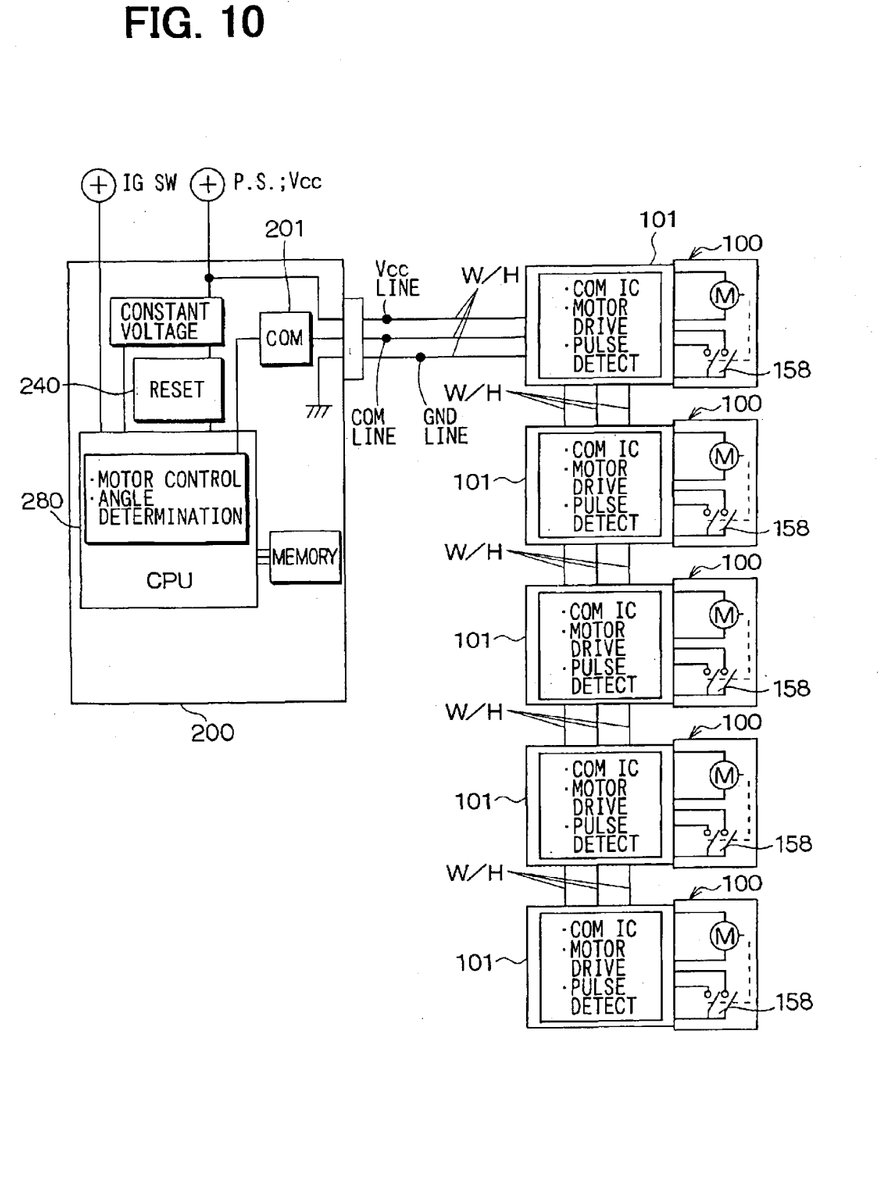
FIG. 10 is a block diagram of an actuator system according to the second embodiment of the present invention.

Referring to FIG. 10, an actuator system includes multiple actuators 100 and a control device 200 connected via a multiplex communication network. This configuration requires less electrical wiring. The CPU and each actuator 100 exchange data signals to control the actuator 100 according to a predetermined protocol and data signals on the number of pulses via communication lines. The actuator 100 operates based on the data signals.

Each connector 101 includes an integrated circuit (IC) for communication, a motor driving circuit, and a pulse detecting circuit. The connectors 101 and the control circuit are connected via wire harnesses W/H that include power supply (Vcc) lines, communication lines, and ground (GND) lines.

Figure 11:
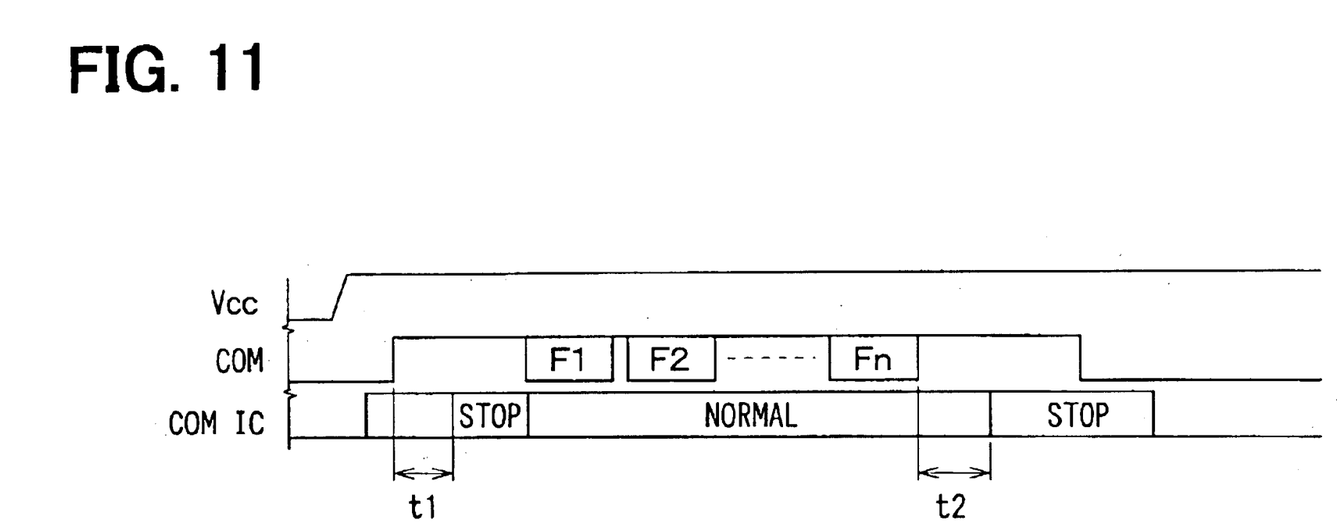
FIG. 11 is a timing chart showing operations of the actuator system.

Conditions of a power supply voltage Vcc, a voltage of the communication line (COM V), operations of the IC (COM IC) are shown in FIG. 11. The IC starts operating when the voltage Vcc reaches a threshold voltage. A reset signal is inputted from the reset circuit 240 to the CPU when the voltage Vcc becomes lower than a predetermined level. When the CPU is reset according to the reset signal, Hi signals are outputted from a communication circuit 201 to the communication line. If the Hi signals continue to be outputted for a predetermined period (t1), the IC determines that a failure condition occurs in the CPU. The IC stops the motor via rheostatic braking. A motor stopping circuit 212 is included in the IC or the motor driving circuit 211.

When the CPU is restarted, frame signals (F1, F2, . . . Fn) corresponding each actuator 100 are inputted to the IC. The IC determines that the CPU or the motor control section operates properly and determines an amount of overrun angle by reading a condition of a pulse encoder.

When the frame signals are not inputted and the signal at the communication line remains Hi for a predetermined period (t2), the IC determines that a failure condition occurs in the CPU. Then, it stops the motor 110 via rheostatic braking.

The present invention should not be limited to the embodiment previously discussed and shown in the figures, but may be implemented in various ways without departing from the spirit of the invention. For example, the reference position may be uses as the origin. The motor stopping circuit 212 may be stopped.

The present invention may be applied to devices other than vehicular air conditioning system and to other types of angle detecting devices such as an optical encoder. The pulse generators 158 (pulse plates 153) may be provided in a different configuration. Additional rotating sections that rotate at lower speed for generating pulse signals may be provided.

The pattern plates 153 may be constructed by plating gears of the speed reduction mechanism 120 with a conductive member, or by pressing a metal plate. The common pattern 154 may be arranged at an outer position than the pulse patterns 151, 152, or between the pulse patterns 151, 152. When the Hi signals are inputted via the pull-up resistor 250, the motor 110 may be stopped within two-pulse period and back lash of the speed reduction gear may be detected for a one pulse.

What is claimed is:

1. An electric actuator system comprising:

an electric motor having an output shaft;

a rotation angle determination means that detects a rotation angle of the output shaft based on a pulse signal produced by a pulse generator according to a rotation angle of the electric motor;

a motor control means that controls an operation of the electric motor based on the rotation angle determined by the rotation angle determination means;

a reset means that turns off the motor control means when a voltage applied to the motor control means becomes lower than a predetermined level, and turns on the motor control means when the voltage becomes higher than the predetermined level;

a motor driving means that supplies driving current to the electric motor based on a control signal from the motor control means;

a motor stopping means that stops the electric motor via electric braking based on the control signal from the motor control means within a time that pulses counted after the motor control means is turned off is less than a predetermined number; and a motor stopping means driving means that drives the motor stopping means when the motor control means is turned off by the reset means.

2. The actuator system according to claim 1, further comprising a memory data revising means that revises memory data on a rotation angle based on a pulse signal at a time when the motor control means is turned on by the reset means.

3. The actuator system according to claim 2, wherein the motor stopping means is activated based on a control signal from the motor control means for a predetermined period after the motor control means is turned on.

4. The actuator system according to claim 1, wherein:

the motor control means controls the motor stopping means by outputting high level and low level signals to two signal lines that are connected to the motor stopping means;

the motor stopping means is activated when the signals at both signal lines are high levels; and the motor stopping means driving means outputs the high level signal to each signal line.

5. The actuator system according to claim 1, wherein:

a plurality of connectors and actuators are provided the electric motor, the pulse generator, the rotation angle determination means, the motor driving means, and the motor stopping means are integrated as a connector and a actuator;

the motor control means, the reset means, and the motor stopping means driving means are integrated in an electric control means; and the electric control means is connected with the connectors via wire harnesses for multiplex communication.

* * * * *